United States Patent Office 3,363,148
Patented Jan. 9, 1968

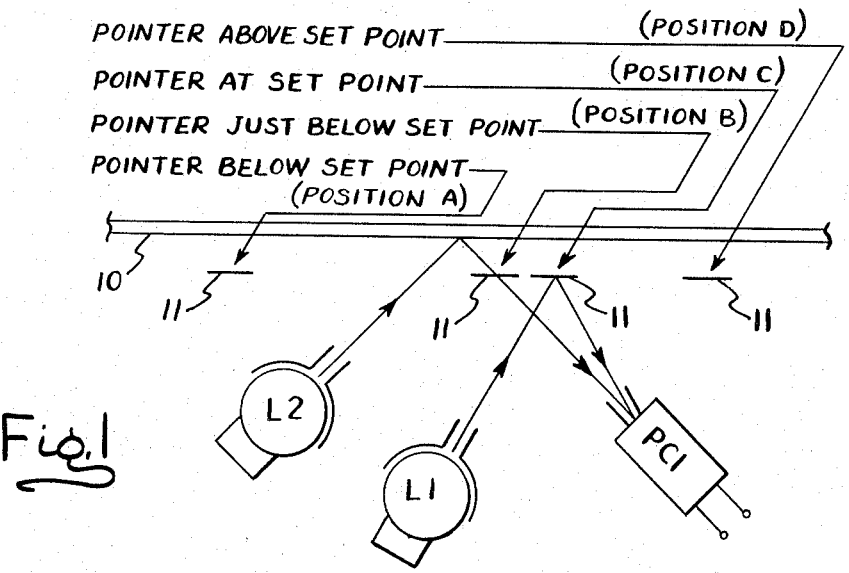
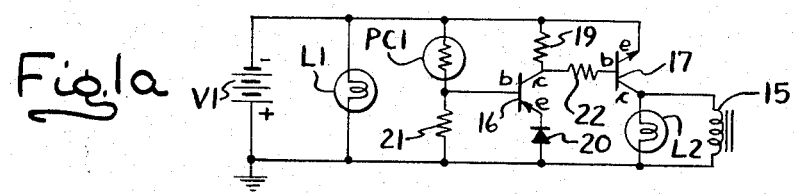
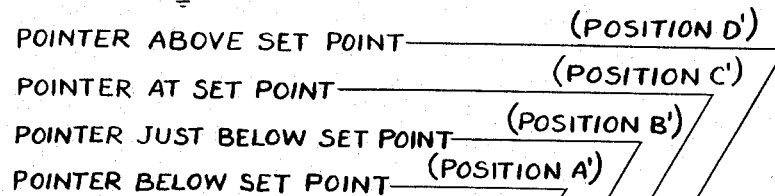

3,363,148
POINTER-DEFLECTION INSTRUMENT MONITORING DEVICE
John D. Freeman, Westport, Conn., assignor to General Time Corporation, New York, N.Y., a corporation of Delaware
Filed May 7, 1964, Ser. No. 365,649
7 Claims. (Cl. 317—124)

ABSTRACT OF THE DISCLOSURE

In the arrangement of FIGS. 1 and 1a, a reflective pointer moves across a reflective instrument face in front of a pair of lights and a photoconductive cell. The first lamp (L1) is so positioned that its light is reflected off the pointer onto the cell when the pointer is at a set point. The second lamp (L2) is so positioned that its light is reflected off the instrument face onto the cell *except* when the pointer is just below the set point and blocks the second lamp's light from the cell. The second lamp and an output relay (15) are temporarily energized by an electronic circuit in response to light from the first lamp hitting the cell as the pointer passes across the set point on its way up the scale and, in response to light from the second lamp hitting the cell, they continue to be energized even as the pointer moves past the set point. Subsequently, when the pointer swings below the set point on its way down the scale, it blocks the second lamp's light from the cell, and the relay and the second lamp are de-energized.

In the arrangement of FIGS. 2 and 2a, a non-reflective pointer moves across a reflective instrument face opposite which are positioned a pair of lamps and a pair of photoconductive cells so aligned that light from the respective lamps is reflected off the instrument face onto different ones of the cells. One of the lamps (L1') and an output relay in parallel with it (115) is powered by an electronic circuit controlled by the cells in such a manner that the relay and the controlled lamp are shut off when, and only when, the cell (PC1') normally illuminated by the lamp is blocked from light while the other cell (PC2') is illuminated. As the pointer sweeps past a set point, it blocks cell PC1' from light, shutting off the lamp L1' and the output relay with it. With lamp L1' shut off, the cell PC1' and the control relay remain de-energized even though the pointer moves past its set point. When the pointer swings back down, past its set point, it blocks cell PC2', and with both cells non-illuminated, the light L1' and the output relay are again energized.

The present invention relates to a pointer-deflection instrument monitoring device and more specifically to a device for monitoring a meter or the like wherein an indication is provided when the indicating pointer thereof reaches a preselected point in its sweep and the indication is sustained as long as the pointer is at or above the preselected point.

A primary object of the present invention is to provide a new and improved pointer-deflection instrument monitoring device. Another object is to provide such a monitoring device which not only indicates when the indicating pointer reaches a preselected point in its sweep, but also sustains the indication as long as the pointer is at or above the preselected point. Still another object is to provide such a monitoring device which is actuated without loading the instrument being monitored and thus may be utilized in connection with the most sensitive instrument without affecting the sensitivity thereof.

Additionally, an object of the present invention is to provide a new and improved monitoring device which is readily portable and may be easily mounted adjacent a desired pointer-deflection instrument for monitoring the movement of the pointer thereof. A further object is to provide such a monitoring device which may be readily preset to any desired indicating point over the entire range of any given pointer-deflection instrument.

A more specific object of the present invention is to provide a monitoring device which converts an existing pointer-deflection instrument into an indicating "on-off" controller. Another more specific object is to provide a monitoring device for controlling an alarm or the like to indicate that the indicating pointer of a pointer-deflection instrument has reached or exceeded a preselected maximum point. A related object is to provide such a monitoring device which functions without disturbing or modifying the existing instrument with which it is associated and the process the instrument is measuring.

Still another more specific object of the present invention is to provide a new and improved monitoring device for pointer-deflection instruments which employs photoconductive cells as control elements. A related object is to provide such a monitoring device wherein only a single photoconductive cell is utilized. Another related object is to provide such a monitoring device wherein a pair of photoconductive cells are utilized.

A general object of the present invention is to provide a new and improved monitoring device for pointer-deflection instruments which is characterized in its compactness, simplicity, economy, stability and accuracy.

Other objects and advantages of the invention will become apparent upon reading the attached detailed description and uopn reference to the drawings, in which:

FIGURE 1 illustrates the relationship between the pointer-deflection instrument and photoconductive control elements utilized in a single, photoconductive cell monitoring device constructed in accordance with the present invention.

FIG. 1A is a schematic diagram of the control circuit for the monitoring device utilizing the photoconductive control elements shown in FIG. 1;

FIG. 2 illustrates the relationship between a pointer-deflection instrument and the photoconductive control elements utilized in a dual-photoconductive cell monitoring device constructed in accordance with the teachings of the present invention;

Figure 2A:
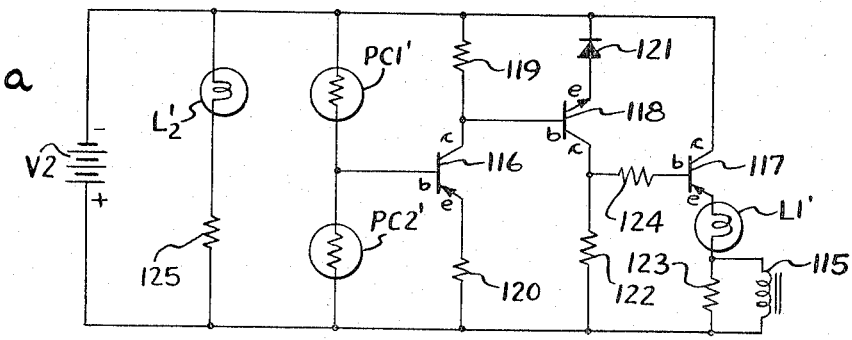
FIG. 2A is a schematic diagram of the control circuit for a monitoring device utilizing the photoconductive control elements shown in FIG. 2.

While the invention has been described in connection with certain preferred embodiments, it is to be understood that the invention is not to be limited to the disclosed embodiments but, on the contrary, the invention is intended to cover the various modifications and equivalent arrangements included within the spirit and scope of the appended claims.

In accordance with the present invention, means are provided for producing an indication when the pointer of a pointer-deflection instrument has reached a preselected position in its sweep and for subsequently sustaining the indication as long as the pointer is at or above the preselected position. More specifically, means including at least one photoconductive cell are provided for rendering a final control element operative when the pointer of a pointer-deflection instrument has reached a preselected position in its sweep, for subsequently maintaining the final control element operative as long as the pointer is at or above the preselected position, and for rendering the final control element nonoperative when the pointer subsequently reaches a position just below the preselected position.

Referring to FIGS. 1 and 1A, a first embodiment of a device for monitoring the position of the pointer of a pointer-deflection instrument is illustrated. The monitoring device employs a photoconductive cell PC1 and a pair of lamps L1 and L2 mounted adjacent the face 10 of a pointer-deflection instrument including a pointer 11 which has a highly reflective surface. As is well known to those skilled in the art, a photoconductive cell has a resistance value dependent upon the amount of light projected thereon, the cell being in its high resistive state when no light is projected thereon and being in its lower resistive state when light is projected thereon. The lamps and the photoconductive cell are so mounted adjacent the face of the instrument that, (1) when the pointer 11 is at a preselected "set" point in its sweep, designated as position C, and the lamp L1 is illuminated, light emitted by the lamp L1 reflects off of the pointer onto the photoconductive cell PC1 causing the cell to attain its low resistive state and (2) when the lamp L2 is illuminated and the pointer is at any point in its sweep except at position B just below the set point, the light from lamp L2 reflects off of the face 10 of the instrument onto the photoconductive cell PC1 causing the cell to attain its low resistive state.

In order for the monitoring device to function as desired, (1) a final control element must be energized when the photoconductive cell PC1 attains its low resistive state, (2) the lamp L1 must be normally illuminated so that light emitted by the lamp L1 reflects off the pointer onto the cell PC1 when the pointer reaches the set point, position C, whereby the cell attains its low resistive state, (3) the lamp L2 must be illuminated when the photoconductive cell PC1 attains its low resistive state so that light from the lamp L2 reflects off the instrument face onto the cell when the pointer is at or above the set point, position C, whereby the cell is maintained in its low resistive state and (4) the pointer must block the reflected light from the lamp L2 when it reaches position B just below the set point so that the cell PC1 returned to its high resistive state and the lamp L2 is extinguished, the final control element being rendered nonoperative when the cell attains its high resistive state.

An exemplary control circuit for the above-described monitoring operation is shown in FIG. 1A. As will become apparent, the control circuit controls the operation of a final control element 15, the final control element 15 being illustrated as a relay and being provided to control the operation of a desired indicating device such as an alarm (not shown). For the purpose of causing the relay 15 to be selectively energized and deenergized in response to the related operations of the lamps L1 and L2 and the cell PC1, a switching network has been provided which, in the exemplary arrangement, employs a PNP transistor 16 and an NPN transistor 17. As may be seen, the collector of transistor 16 is connected to the negative terminal of a voltage source V1 through a resistor 19, the emitter thereof is connected to the positive terminal of the source V1 through a diode 20, and the base thereof is connected to the negative terminal through the cell PC1 and to the positive terminal through a resistor 21. The cell PC1 and the resistor 21 function as a voltage-dividing network for supplying energizing potential to the base or input circuit of the transistor 16. On the other hand, the emitter of transistor 17 is connected to the negative terminal of the source V1, the collector thereof is connected to the positive terminal through the parallel arrangement of the lamp L2 and the relay 15, and the base or input circuit thereof is connected to the collector of the transistor 16 through a resistor 22 so that operation of the transistor 17 is controlled by the transistor 16. It will be readily apparent that, when the transistor 17 is rendered conductive, the lamp L2 is illuminated and the relay 15 is energized.

The lamp L1 is connected directly across the voltage source V1 and is therefore normally illuminated. If it is assumed that under normal operating conditions of the instrument the pointer 11 is at a position, such as position A, which is substantially below the set point position C, no light will be projected on the cell PC1 and the cell will be in its high resistive state. If the circuit components are correctly chosen, substantially all of the voltage provided by the source V1 appears across the cell PC1 when it is in its high resistive state and the voltage appearing across resistor 21 is insufficient to overcome the effect of the diode 20 in the emitter circuit of transistor 16 so that transistor 16 is maintained nonconductive. Under such conditions, the collector of transistor 16 will be at substantially the same potential as the emitter of transistor 17. Since the base of transistor 17 is connected to the collector of transistor 16, transistor 17 is likewise maintained nonconductive. It follows that the lamp L2 is extinguished and the relay 15 is nonenergized when the cell PC1 is in its high resistive state and the transistors 16 and 17 are nonconductive.

If the pointer 11 subsequently moves to the set point, position C, light from the lamp L1 reflects off the pointer onto the photocell PC1 causing the resistance thereof to be reduced. In response to the reduction in the photocell resistance, a greater portion of the voltage from the voltage source V1 appears across the resistor 21 which overcomes the effect of the diode 20 causing the transistor 16 to become partially conductive so that the potential at the collector thereof rises. In response to the rising collector potential, transistor 17 is likewise rendered partially conductive causing the lamp L2 to be partially illuminated and the relay 15 to be partially energized. The relay 15 is so designed that the transistor 17 must be conducting heavily before the relay 15 is fully energized and is rendered operative. The light from the lamp L2 now reflects off of the instrument face 10 onto the cell PC1 and this light aids the light from lamp L1 reflected off the pointer 11 in causing the resistance of the cell to be further reduced. A regenerative action thus takes place as the lamp L2 becomes more illuminated causing transistors 16 and 17 to be rendered fully conductive and causing lamp L2 to become fully illuminated. Thus, when the pointer has reached the set point, position C, the final control element 15 is rendered operative, i.e., the relay 15 is fully energized, so that a desired indicating device (not shown) such as an alarm is rendered operative.

Subsequently, if the pointer 11 moves to a position, such as position D, above the set point, the light emitted by the lamp L1 is no longer projected onto the cell PC1. However, the light emitted by the lamp L2 will continue to be reflected off the instrument face 10 onto the cell PC1 causing the cell to be maintained in its low resistive state so that the lamp L2 is maintained illuminated and the relay 15 is maintained energized. Thus, the related operation of the lamp L2 and the cell PC1 locks the relay in its energized condition.

Subsequently, if the pointer moves to a position just below the set point, designated as position B, the light emitted by the lamp L2 and reflected off the instrument face 10 onto the photocell PC1 is blocked by the pointer 11. Accordingly, at this time, no light emitted by either of the lamps L1 or L2 is reflected onto the cell PC1. Consequently, the cell PC1 will return to its high resistive state causing substantially all of the voltage from the source V1 to again appear across the cell PC1. As a result, the transistor 16 is again rendered nonconductive which in turn causest the transistor 17 to be again rendered nonconductive. Under such conditions, the lamp L2 will be extinguished and the relay 15 will be deenergized. Thus, when the pointer moves to position just below the set point, the final control element is rendered nonoperative, i.e., the relay 15 is denergized, so that the related indicating device is likewise rendered nonoperative.

Referring to FIGS. 2 and 2A, a second embodiment of a monitoring device is illustrated which employs a pair of lamps L1' and L2' and a pair of photoconductive cells PC1' and PC2'. In this arrangement, the lamps and photocells are mounted adjacent the pointer-deflection instrument so that the light emitted by the lamps L1' and L2' projects off the face 110 of the instrument onto the respective photocells PC1' and PC2' when the lamps are illuminated.

The second embodiment is so designed that, under normal conditions when the pointer 111 is below the set point, both lamps L1' and L2' are illuminated causing light to be projected onto the respective photoconductive cells PC1' and PC2' whereby the cells are placed in their low resistive states and a final control element 115, again designated as a relay, is energized. It will be again assumed that the final control element 115 controls the operation of an indicator device (not shown) such as an alarm. However, in this instance, it will be assumed that the indicator device is rendered nonoperative when the relay 115 is energized and is rendered operative when the relay is deenergized.

When the pointer reaches a preselected set point, designated as position C', the light from the lamp L1' is blocked thereby so that light is no longer projected onto the cell PC1' and the cell attains its high resistive state. As will become apparent, the lamp L1' is extinguished and the relay 115 is deenergized under such conditions. Subsequently, if the pointer moves to a position, for example position D' above the set point, no effect will be had upon the monitoring device so that the lamp L1' remains extinguished and the relay 115 remains deenergized. However, if the pointer moves to a position just below the set point, designated as position B', the light emitted by the lamp L2' and reflected onto the cell PC2' is blocked thereby so that the cell PC2' attains its high resistive state. Under such conditions, as will become apparent, the lamp L1' is again illuminated and the relay 115 is again energized.

For the purpose of controlling the operation of the relay 115 in response to the related operations of the lamps L1' and L2' and the photoconductive cells PC1' and PC2', a switching network is provided which, in the exemplary arrangement, includes a pair of PNP transistors 116 and 117 having an NPN transistor 118 interposed therebetween. The collector of transistor 116 is connected to the negative terminal of a voltage source, designated as V2, through a resistor 119, the emitter thereof is connected to the positive terminal of the voltage source V2 through a resistor 120, and the base thereof is connected to the negative terminal through the photoconductive cell PC1' and to the positive terminal through the photoconductive cell PC2'. The photoconductive cells PC1' and PC2' function as a voltage-dividing network and thus control the operation of the transistor 116. The cells PC1' and PC2' are so chosen that (1) when both cells are in their high resistive states, the transistor 116 is conductive, (2) when the cell PC1' is in its high resistive state and the cell PC2' is in its low resistive state, the transistor 116 is nonconductive, (3) when the cell PC1' is in its low resistive state and the cell PC2' is in its high resistive state, the transistor 116 is conductive and (4) when both cells are in their low resistive states, the transistor 116 is conductive.

The emitter of transistor 118 is connected to the negative terminal of the voltage source V2 through a diode 121, the collector thereof is connected to the positive terminal through a resistor 122, and the base thereof is connected to the collector of the transistor 116 so that operation of transistor 118 is controlled by the operation of transistor 116. The collector of transistor 117 is connected to the negative terminal of the voltage source V2, the emitter thereof is connected to the positive terminal through the lamp L1' and the parallel arrangement of a current limiting resistor 123 and the relay 115, and the base thereof is connected to the collector of transistor 118 through a resistor 124 so that operation of transistor 117 is controlled by the operation of transistor 118. It follows that, when transistor 117 is rendered conductive, the lamp L1' is illuminated and the relay 115 is energized.

The lamp L2' is connected across the voltage source V2 through a current limiting resistor 125 so that the lamp L2' is normally illuminated. If it is assumed that initially the pointer 111 is at a position A' substantially below the set point, the light emitted by the lamp L2' is reflected off the face 110 of the instrument onto the cell PC2' causing the cell to be in its low resistive state. Additionally, if it is assumed that the lamp L1' is illuminated, light emitted by the lamp L1' is reflected off the instrument face onto the cell PC1' so that the cell PC1' is likewise in its low resistive state. Under such conditions, transistor 116 is conductive so that the potential at the collector thereof is substantially positive in respect of the emitter of the transistor 118 and the transistor 118 is likewise conductive. This causes the collector of transistor 118 to be substantially negative with respect to the emitter of the transistor 117 so that the transistor 117 is also conductive causing current to flow through the relay 115 and the lamp L1' whereby the relay 115 is energized and the lamp L1' is maintained illuminated.

If, at a subsequent time, the pointer reaches the set point, position C', the light from the lamp L1' is blocked thereby so that the photocell PC1' attains its high resistive state causing substantially all of the voltage from the source V2 to appear thereacross so that the transistor 116 is rendered nonconductive. In response thereto, transistors 118 and 117 are likewise rendered nonconductive due to the dropping and rising of the potentials at the respective bases thereof. Consequently, the lamp L1' is extinguished and the relay 115 is deenergized so that the indicator device (not shown) is rendered operative. If, subsequently, the pointer moves to a position such as position D' above the set point, no effect will be had upon the monitoring circuit and the lamp L1' remains extinguished whereas the relay 115 remains deenergized, the indicator device thus remaining operative.

Assuming that at a subsequent time the pointer moves to a position just below the set point, designated as position B', the light emitted by the lamp L2' and reflected onto the cell PC2' is blocked thereby causing the cell PC2' to attain its high resistive state. Under such conditions, both the cells PC1' and PC2' are in their high resistive states causing the transistor 116 to again be rendered conductive. In response to the conduction of transistor 116, transistors 118 and 117 are rendered conductive in response to the rising and dropping of the potentials at the respective bases thereof. Accordingly, the lamp L1' is again illuminated and the relay 115 is again energized so that the indicator device is rendered nonoperative.

Figure 3:
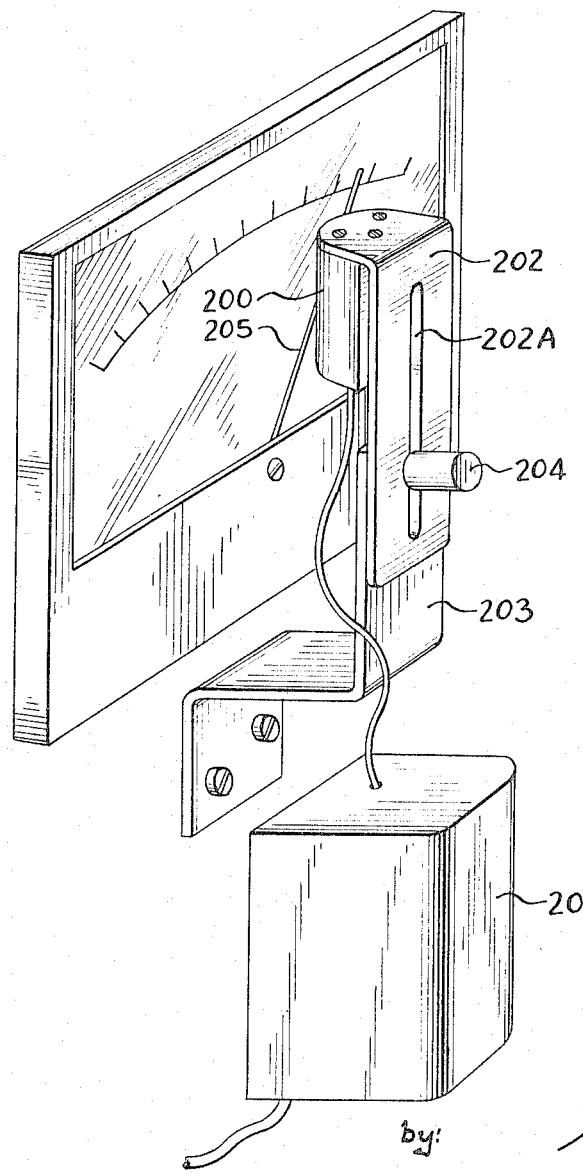
FIG. 3 is a perspective front elevational view showing the relationship between a pointer-deflection instrument and a monitoring device embodying the present invention.

Referring to FIG. 3, a typical pointer-deflection instrument is illustrated having a monitoring device mounted thereadjacent. A lamp photocell assembly 200 is provided for housing the lamps and photocells utilized in the monitoring device. Likewise, a circuit assembly 201 is provided for housing the remaining electrical components of the monitoring device. As may be seen, adjustable means have been provided for mounting the lamp photocell assembly 200 adjacent the pointer-deflection instrument. The mounting means includes a flanged bracket 202 to which the assembly 200 is secured and includes an off-set mounting bracket 203 to which the flanged bracket 202 is in turn secured. For this latter purpose, the flanged bracket 202 has a longitudinal guide slot 202a for receiving a pin-like member 204 which may, for example, threadably secure the flanged bracket 202 to the off-set bracket 203. Upon viewing the arrangement in FIG. 3, it will be apparent that, when the securing pin-like member 204 is loosened, the flanged bracket 202 may be moved in a vertical direction whereby the vertical position of the lamp photocell assembly 200 may be varied. Additionally, it will be apparent that, if the off-set bracket 203 is mounted so that the pin-like member 204 is adjacent the center line of the instrument pointer 205 and the pin-like member is loosened, the flanged bracket 202 and thus the lamp photocell assembly 200 may be pivoted whereby the assembly 200 may be positioned to detect the movement of the pointer 205 past any preselected set point in the sweep of the pointer 205.

Although two specific embodiments of the invention have been disclosed, its true scope is reflected by the scope of the claims. To help relate the language of the claims to the necessarily more specific language of the specification and also to summarize the invention, the following observations will prove helpful. In general, means shown as a pair of lamps L1 and L2 are provided for projecting first and second light beams at a pair of spaced apart areas on the face of an instrument whose pointer is to be monitored, these light beams being in the path of the pointer (see FIGS. 1 and 2). Cooperating with the projected light beams is a control means which includes light detecting means positioned to receive reflections of the light beams from the instrument. In the circuit of FIG. 1 a single cell PC1 is used for this purpose, while a pair of cells PC1' and PC2' perform this function in the FIG. 2 embodiment.

In response to a first momentary change in the illumination level of the detecting means, caused by movement of the instrument pointer 11 across the first beam in a first direction (shown as clockwise in FIGS. 1 and 2), the control means, which in the exemplary embodiment of FIG. 1 includes the circuitry of FIG. 1a and which in the exemplary embodiment of FIG. 2 includes the circuit of FIG. 2a, changes the brightness of one of the projected light beams so as to keep the illumination level of the light detecting means at the level to which it changed as a result of the first momentary change. In the exemplary embodiment of FIG. 1, light from the second light beam, projected from lamp L2, is reflected onto the detecting means PC1 from the instrument face 10 and the first momentary change in the illumination level at the detecting means is effected by energizing the lamp L2 in response to the reflection of the first light beam (projected by the lamp L1) off the pointer 11 onto the detecting means PC1. In the FIG. 2 modification, both of the light beams projected by the lamps L1' and L2' are reflected onto the detecting means PC1' and PC2' from the instrument face 110 and the first change in the illumination level at the detecting means PC1' and PC2' is effected by de-energizing the lamp L1' in response to blockage of the first light beam (projected by the lamp L1') by the pointer 111. In response to a second momentary change in the illumination level of the light detecting means, caused by movement of the pointer across the second light beam (projected by the lamp L2 in FIG. 1 and by the lamp L2' in FIG. 2) in an opposite direction (shown as counterclockwise) the brightness of the projected light beam which was changed when the instrument pointer moved across the first light beam in the first direction is returned to substantially its original level. In the FIG. 1 embodiment this second momentary this second momentary change in the illumination level of the detecting means PC1 is brought about by de-energizing the lamp L2 due to blockage of the second light beam (projected by the lamp L2) from the detecting means PC1 by the pointer 111. On the other hand, in the FIG. 2 embodiment, the second momentary change in the illumination level of the detecting means PC1', PC2' is effected by re-energizing the lamp L1', this being brought about by blockage of the second light beam from the detecting means PC1', PC2' by the pointer 111.

In view of the foregoing, it will be appreciated that a monitoring device has been provided which not only indicates when the pointer of a desired pointer-deflection instrument reaches a preselected set point in its sweep, but also sustains the indication as long as the pointer is at or above the preselected set point. Additionally, it will be readily appreciated that the embodiment in FIGS. 1 and 1A is utilizable where the pointer 11 is highly reflective or can readily be made highly reflective. On the other hand, the embodiment in FIGS. 2 and 2A is utilizable when the pointer 111 is not reflective and cannot be conveniently made reflective.

I claim as my invention:

1. In a device for monitoring a pointer-deflection instrument without loading it, said instrument having a reflective pointer mounted for movement across a reflective instrument face, the combination comprising
   (a) photoconductive detecting means,
   (b) means for projecting first and second light beams through spaced apart areas successively traversed in that order by the pointer of the instrument during its upward sweep across the face of the instrument,
   (c) means for normally enabling said projecting means to produce said second light beam, said beam being reflected onto said detecting means by said pointer when it traverses the area through which said second beam passes,
   (d) control means responsive to the illuminated condition of said detecting means for enabling said projecting means to produce said first light beam, said beam being reflected by said instrument face onto said detecting means, thereby maintaining it illuminated until on its downward swing the pointer interrupts said first light beam, and
   (e) output utilization means connected to respond to said control means.

2. In a device for monitoring an instrument without loading it, said instrument having an opaque pointer mounted for movement across a reflective instrument face, the combination comprising
   (a) means for detecting light,
   (b) means for projecting first and second light beams at the face of said instrument, said light beams being
      (1) reflected from said instrument face onto said detecting means, and
      (2) successively interrupted by the pointer of the instrument during its upward swing across said instrument face,
   (c) control means responsive
      (1) to non-illumination of said detecting means by said second light beam during concurrent illumination of said detecting means by said first light beam for disabling said projecting means from producing said second light beam, said second light beam being initially interrupted by the pointer during its upward sweep across the beam's path, and
      (2) to concurrent non-illumination of said detecting means by either light beam for enabling said projecting means to produce said second light beam, said first light beam being interrupted while said second light beam is still extinguished, and hence said second light beam being reestablished, when the pointer sweeps across the first light beam's path during its downward sweep across the face of the instrument, and
   (d) output utilization means connected to respond to said control means.

3. In a device for monitoring a pointer-deflection instrument without loading the instrument, the combination which comprises
   (a) first and second lamps for directing light onto the face of the instrument when illuminated,
   (b) a final control element,
   (c) a photoconductive cell mounted adjacent the face of the instrument and having a relatively high resistive state when no light is projected thereon and having a relatively low resistive state when light is projected thereon,
   (d) means for normally illuminating the first lamp, light emitted by the first lamp being reflected off the pointer of the pointer-deflection instrument onto the photoconductive cell when the pointer reaches a preselected point in its sweep, and (e) means responsive to the photoconductive cell attaining its low resistive state for rendering the final control element operative and for illuminating the second lamp so that light emitted thereby reflects off the face of the instrument onto the photoconductive cell to sustain the photoconductive cell in its low resistive state and to maintain the final control element operative, light emitted by the second lamp and reflected off the instrument face onto the photoconductive cell being blocked by the pointer when the pointer reaches a position just below the preselected point so that the photoconductive cell returns to its high resistive state and the final control element is rendered nonoperative.

4. In a device for monitoring an instrument without loading it, said instrument having an opaque pointer mounted for movement across a reflective instrument face, the combination which comprises (a) first and second lamps which are normally illuminated and which are mounted adjacent the instrument face for projecting light thereon, (b) a final control element, (c) first and second photoconductive cells having high resistive states when no light is projected thereon and having low resistive states when light is projected thereon, and (d) means responsive (1) to the photoconductive cells attaining their low resistive states for causing the final control element to be rendered operative, (2) to the first photoconductive cell attaining its high resistive state while the second cell is in its low resistive state for rendering the final control element nonoperative and causing the first lamp to be extinguished, and (3) to the second photoconductive cell attaining its high resistive state for causing the first lamp to be illuminated and the final control element to be rendered operative, light emitted by the first and second lamps normally reflecting off the face of the instrument onto the respective first and second photoconductive cells whereby the final control element is rendered operative, light from the first lamp being blocked by the pointer of the instrument when the pointer reaches a preselected point whereby the first photoconductive cell attains its high resistive state and the final control element is made nonoperative, and light from the second lamp being blocked by the pointer when it subsequently reaches a point just below the preselected point whereby the second photoconductive cell attains its high resistive state and the final control element is again rendered operative.

5. In a device for monitoring a pointer-deflection instrument without loading it, said instrument having a pointer mounted for movement across an instrument face, the combination comprising (a) means for projecting first and second light beams at a pair of spaced apart areas on said instrument face in the path of said pointer, and (b) control means, including light detecting means positioned to receive reflections of said first and second light beams from said instrument, and responsive (1) to a first momentary change in the illumination level of said light detecting means caused by movement of said pointer across said first light beam in a first direction of changing the brightness of one of said projected light beams so as to keep the illumination level of said light detecting means at the level to which it changed as a result of said first momentary change, and (2) to a second momentary change in the illuminaton level of said light detecting means caused by movement of said pointer across said second light beam in an opposite direction for returning the brightness of said one of said projected beams to substantially its original level.

6. The combination of claim 5 further characterized in that said second light beam is reflected onto said light detecting means from said instrument face, in that said first momentary change in light detecting means illumination level is caused by reflection of said first light beam off said pointer onto said light detecting means, and in that said second momentary change in detector illumination level is caused by blockage of said second light beam from said light detecting means by said pointer.

7. The combination of claim 5 further characterized in that both of said light beams are reflected onto said light detecting means from said instrument face, in that said first momentary change in illumination level is caused by blockage of said first light beam by said pointer, and in that said second momentary change in illumination level is caused by blockage of said second light beam by said pointer.

References Cited

UNITED STATES PATENTS

| 2,971,134 | 2/1961 | Cockrell | 317—130 X |
| 3,071,711 | 1/1963 | Hunter | 317—127 X |
| 3,118,087 | 1/1964 | Eisenberg | 317—130 |
| 3,271,032 | 9/1966 | Rabinowitz et al. | 250—215 X |

FOREIGN PATENTS

| 1,161,046 | 1/1959 | Germany. |

LEE T. HIX, *Primary Examiner.*